(12) United States Patent
Merrifield

(10) Patent No.: US 8,371,088 B2
(45) Date of Patent: Feb. 12, 2013

(54) DEPLOYABLE TRUSS WITH INTEGRAL FOLDING PANELS

(76) Inventor: Donald V. Merrifield, Smyrna, TN (US)

( * ) Notice: Subject to any disclaimer, the term of this patent is extended or adjusted under 35 U.S.C. 154(b) by 61 days.

(21) Appl. No.: 12/765,532

(22) Filed: Apr. 22, 2010

(65) Prior Publication Data

US 2010/0269446 A1  Oct. 28, 2010

Related U.S. Application Data

(60) Provisional application No. 61/171,929, filed on Apr. 23, 2009, provisional application No. 61/180,169, filed on May 21, 2009.

(51) Int. Cl.
*E04H 12/18* (2006.01)
(52) U.S. Cl. .............. 52/646; 52/109; 52/632
(58) Field of Classification Search .......... 52/645, 52/646, 109, 173.3, 7, 632
See application file for complete search history.

(56) References Cited

U.S. PATENT DOCUMENTS

| | | | | |
|---|---|---|---|---|
| 4,475,323 | A * | 10/1984 | Schwartzberg et al. | 52/111 |
| 5,016,418 | A * | 5/1991 | Rhodes et al. | 52/646 |
| 5,154,027 | A * | 10/1992 | Warden | 52/108 |
| 6,904,722 | B2 | 6/2005 | Brown et al. | 52/121 |
| 7,028,442 | B2 * | 4/2006 | Merrifield | 52/651.1 |
| 7,694,486 | B2 * | 4/2010 | Murphy et al. | 52/645 |
| 7,716,897 | B2 * | 5/2010 | Merrifield | 52/651.1 |
| 7,963,084 | B2 * | 6/2011 | Merrifield et al. | 52/646 |
| 2002/0112417 | A1 * | 8/2002 | Brown et al. | 52/108 |
| 2004/0111999 | A1 * | 6/2004 | Schipani et al. | 52/646 |
| 2005/0126106 | A1 * | 6/2005 | Murphy et al. | 52/652.1 |
| 2006/0010821 | A1 * | 1/2006 | Schipani et al. | 52/641 |
| 2007/0044415 | A1 * | 3/2007 | Merrifield et al. | 52/633 |
| 2010/0064624 | A1 * | 3/2010 | Dodd | 52/646 |
| 2010/0101172 | A1 * | 4/2010 | Murphy et al. | 52/646 |

* cited by examiner

*Primary Examiner* — Brian Glessner
*Assistant Examiner* — Adam Barlow
(74) *Attorney, Agent, or Firm* — Wayne Edward Rampage; Baker Donelson

(57) ABSTRACT

A deployable truss that extends and retracts in a stable and synchronous manner, and can deploy integral folding panels. Primary orthogonal joints, each consisting of two hinged halves, connect rotationally to the truss diagonals with an angled fitting. The main hinge pin of the orthogonal joints remains orthogonal to the truss longitudinal axis and remains centered in the folding truss diagonals. Hinge pins of each truss joint are connected by center-folding chords which cause the truss joints of adjacent bays to remain parallel to each other. Folding diagonals connected to the primary joint halves are hinged together, permitting the diagonals on each side of the truss to remain parallel to each as they form the short sides of a rectangular truss. The truss may deploy z-folded panels with active surfaces such as photovoltaic, reflective, heat-radiating, LCD/plasma, or radar; or structural floor panels for folding work platforms, bridges, and walkways.

17 Claims, 6 Drawing Sheets

DEPLOYABLE TRUSS WITH INTEGRAL FOLDING PANELS

This application claims benefit of and priority to U.S. Provisional Application No. 61/171,929, filed Apr. 23, 2009, by Donald V. Merrifield, and U.S. Provisional Application No. 61/180,169, filed May 21, 2009, by Donald V. Merrifield, and is entitled in whole or in part to those filing dates for priority. The specification, figures and complete disclosure of U.S. Provisional Application Nos. 61/171,929 and 61/180,169 are incorporated herein in their entireties by specific reference for all purposes.

FIELD OF INVENTION

This invention relates generally to deployable truss structures, and more particularly to the apparatus and manner in which a three-dimensional truss can be expanded and retracted in a continuous, stable, synchronous fashion.

BACKGROUND OF THE INVENTION

There have been many attempts to design, for various operating environments, a practical compact folding or flexing truss structure which can transition easily between the retracted and the useful extended state while exhibiting favorable characteristics of size/volume ratio, kinematic stability, simplicity and reliability, structural efficiency and weight, complexity, auxiliary mechanism requirements, manufacturing costs, speed of operation, and operating cost. Relatively few designs have appeared in the marketplace. Notable high-profile, and high-flying, examples are deployable trusses used in space missions such as for solar array deployment on NASA's International Space Station. Another example is the deployable truss disclosed in U.S. Pat. No. 7,028,442, which claims priority to U.S. Provisional Patent Application No. 60/302,997 (the complete disclosures, specifications and drawings of U.S. Pat. No. 7,028,442 and Provisional Application No. 60/302,997 are incorporated herein in their entireties by specific reference for all purposes).

SUMMARY OF INVENTION

In various embodiments, the truss described herein extends and retracts in a stable and synchronous manner, requiring no central deployment mechanism or structure to shape and build the truss bays as they extend from the folded state. Primary orthogonal joints, each consisting of two hinged halves, connect rotationally to the truss diagonals with a new angled fitting. The main hinge pin remains orthogonal to the truss longitudinal axis and remains centered in the folding truss diagonals. Hinge pins of each truss joint are connected by center-folding chords which cause the truss joints of adjacent bays to remain parallel to each other, thereby imparting a stable synchronous motion to trusses with a plurality of identical bays, wherein each bay has two of the aforementioned primary joint assemblies, one on each side of the truss.

Folding diagonals connected to the primary joint halves are hinged together, permitting the diagonals on each side of the truss to remain parallel to each as they form the short sides of a rectangular truss in accordance with an exemplary embodiment of the present invention. The diagonals may be connected by simple hinge joints or first hinge joints. The diagonals also may be connected either by center-folding chords or by center-folding panels, either of which can fold within the two truss sides formed by the side diagonals.

The thickness of a folded bay is equal to twice the maximum thickness of the truss diagonals. Major benefits of this new and novel geometry are that the truss can deploy z-folded panels with active surfaces such as photovoltaic, reflective, heat-radiating, LCD plasma, or radar; or structural floor panels for folding work platforms and walkways. In one embodiment, with the use of folding chords versus panels, the present invention can form a rectangular truss beam structure. The truss is symmetrical about at least one axis and can retract with panels or chords tightly folded. Fully retracted, the truss length can be 5 to 10% of the extended length. In this manner, paneled trusses (such as solar photovoltaic) can be quickly folded together for transportation or for environmental protection. Additional applications include, but are not limited to, space structures, marine, theatre staging, military bridging, and disaster relief.

DETAILED DESCRIPTION OF EXEMPLARY EMBODIMENTS

Figure 1:
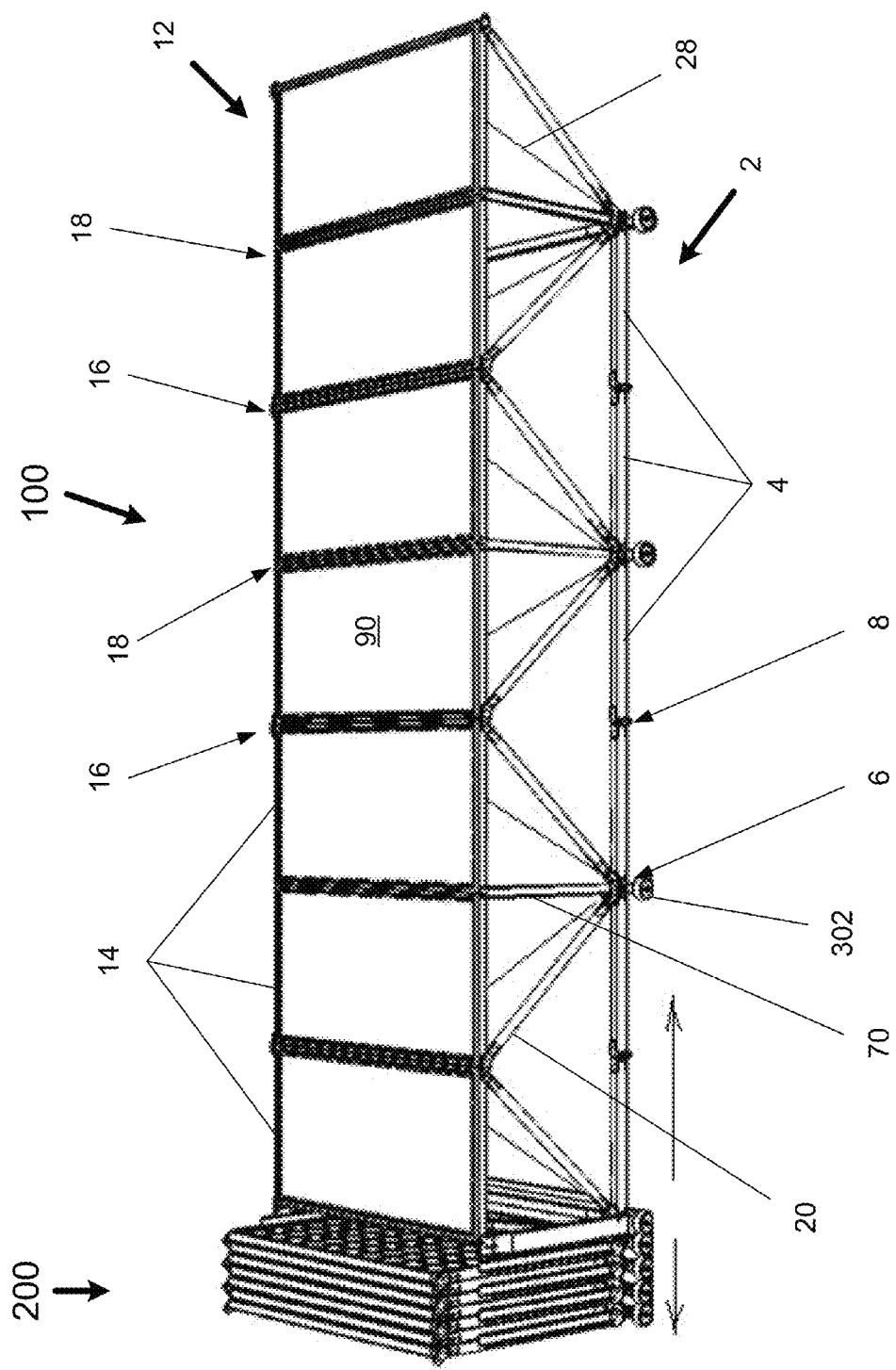
FIG. 1 shows an extended truss in accordance with one embodiment of the present invention adjacent to a truss in a retracted state.
Figure 2:
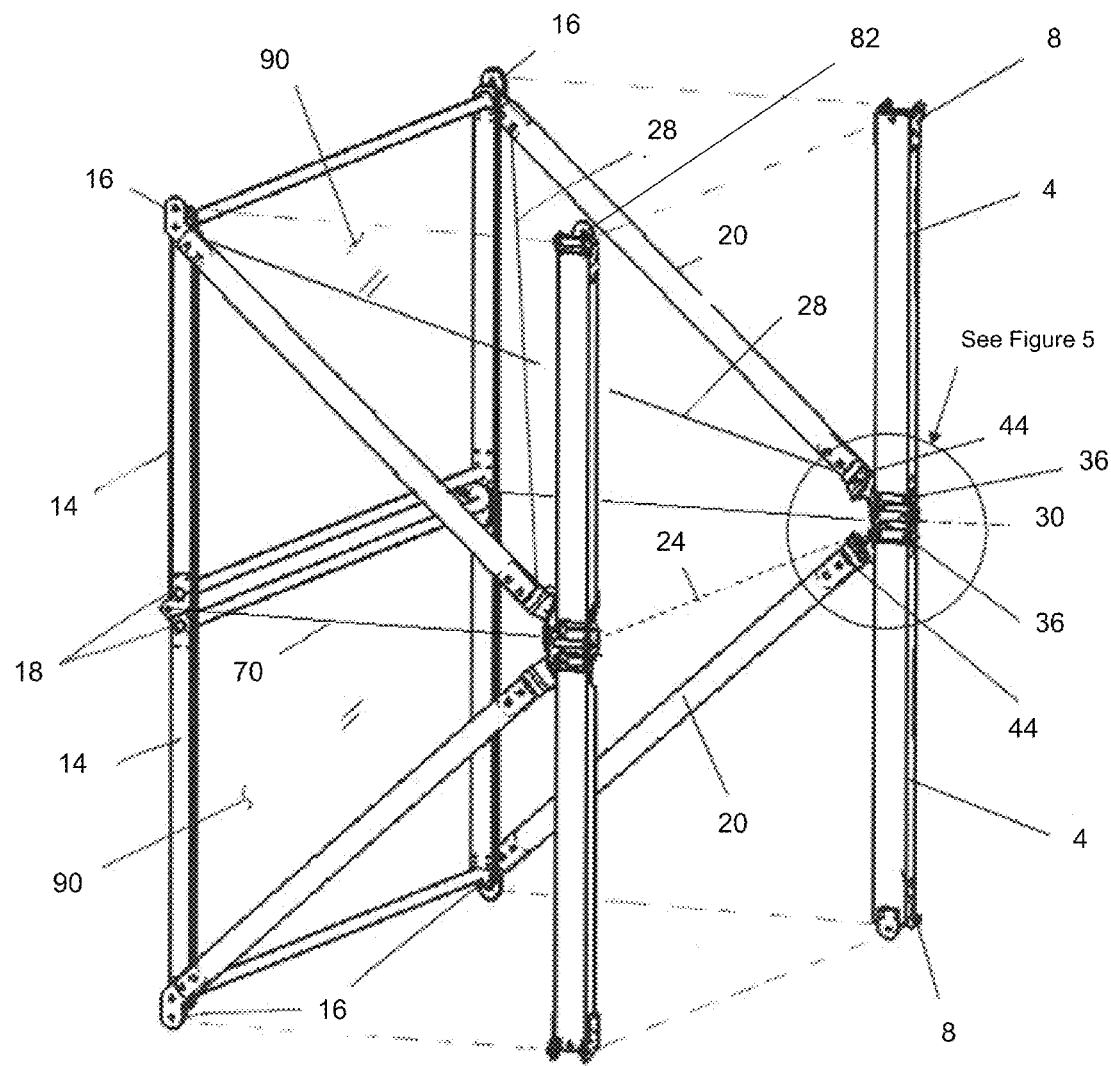
FIG. 2 shows a single truss bay in an extended state.
Figure 3:
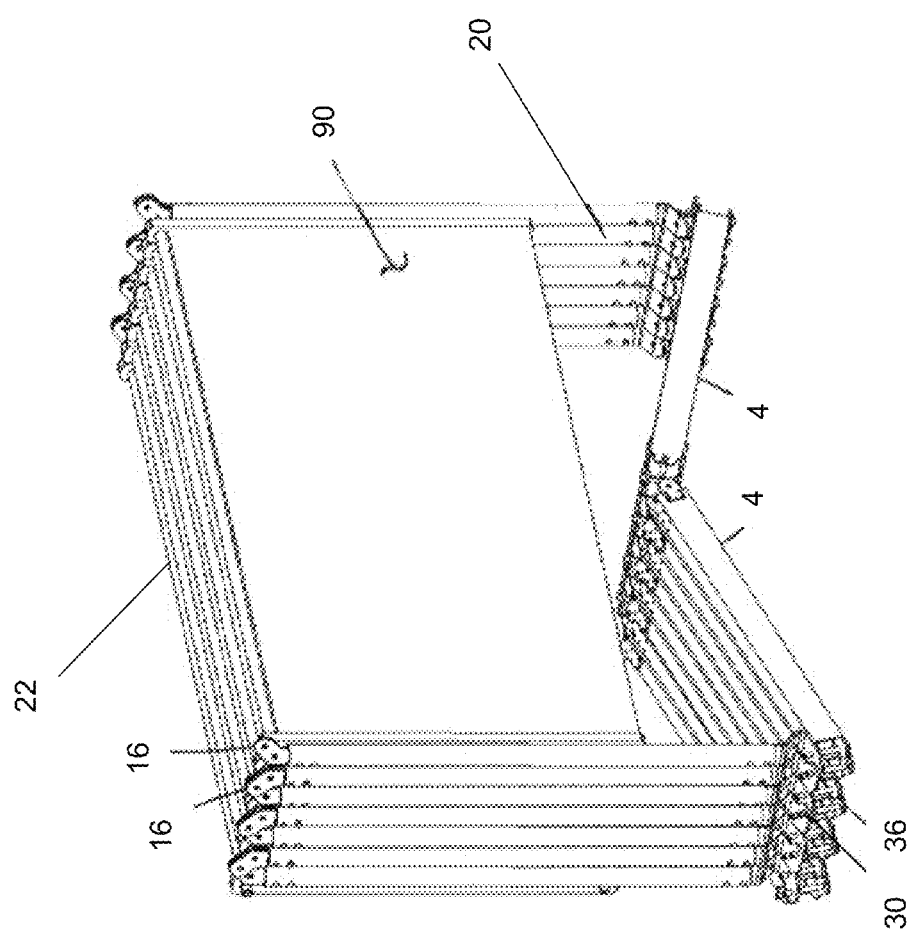
FIG. 3 shows three-and-one-half truss bays in a retracted state.
Figure 4:
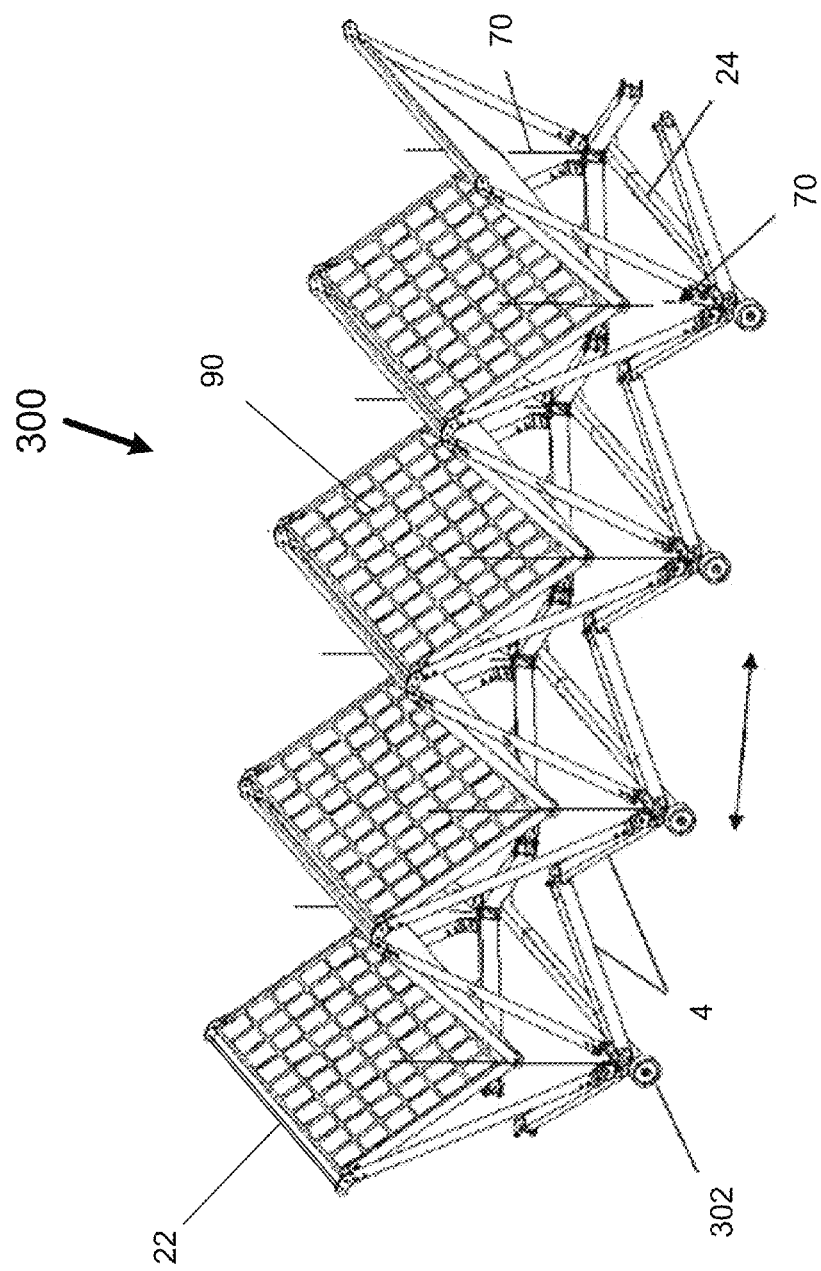
FIG. 4 shows a truss with panels in a partially folded state.

FIGS. 1 through 4 show exemplary embodiments of a deployable truss in accordance with the present invention. FIG. 1 shows two trusses, one truss in a fully extended state 100 and a second truss in a fully retracted (or folded) state 200. FIG. 2 shows the components of a truss bay, while FIG. 3 shows a truss with panels 90 in a fully retracted state. FIG. 4 shows a truss 300 mounted on small rollers or wheels 302 in an intermediate folding state.

In general, a truss in accordance with the present invention is rectangular (with substantially or approximately 90-degree corners) in cross-section at full extension, with two longitudinal primary chords 2 and two longitudinal secondary chords 12. The primary chords are adjacent to each other (i.e., they occupy adjacent corners of the rectangle when viewed in cross-section). Likewise, the two secondary chords are adjacent to each other.

The primary chords 2 are formed by primary chordal members 4 jointedly or hingedly connected end-to-end by alternating primary orthogonal joints 6 and primary chord center-hinge joints 8. The secondary chords 12 are formed by secondary chordal members 14 jointedly or hingedly connected end-to-end by alternating secondary chord hinge joints 16 and secondary chord center-hinge joints 18. In general, each hinge joint comprises two halves hinged together, usually with a hinge pin 82. Each secondary chord is laterally connected with the proximal primary chord by side diagonal members 20. The side diagonal members 20 are connected at opposing ends to a primary orthogonal joint 6 and a secondary chord hinge joint 16.

Figure 5:
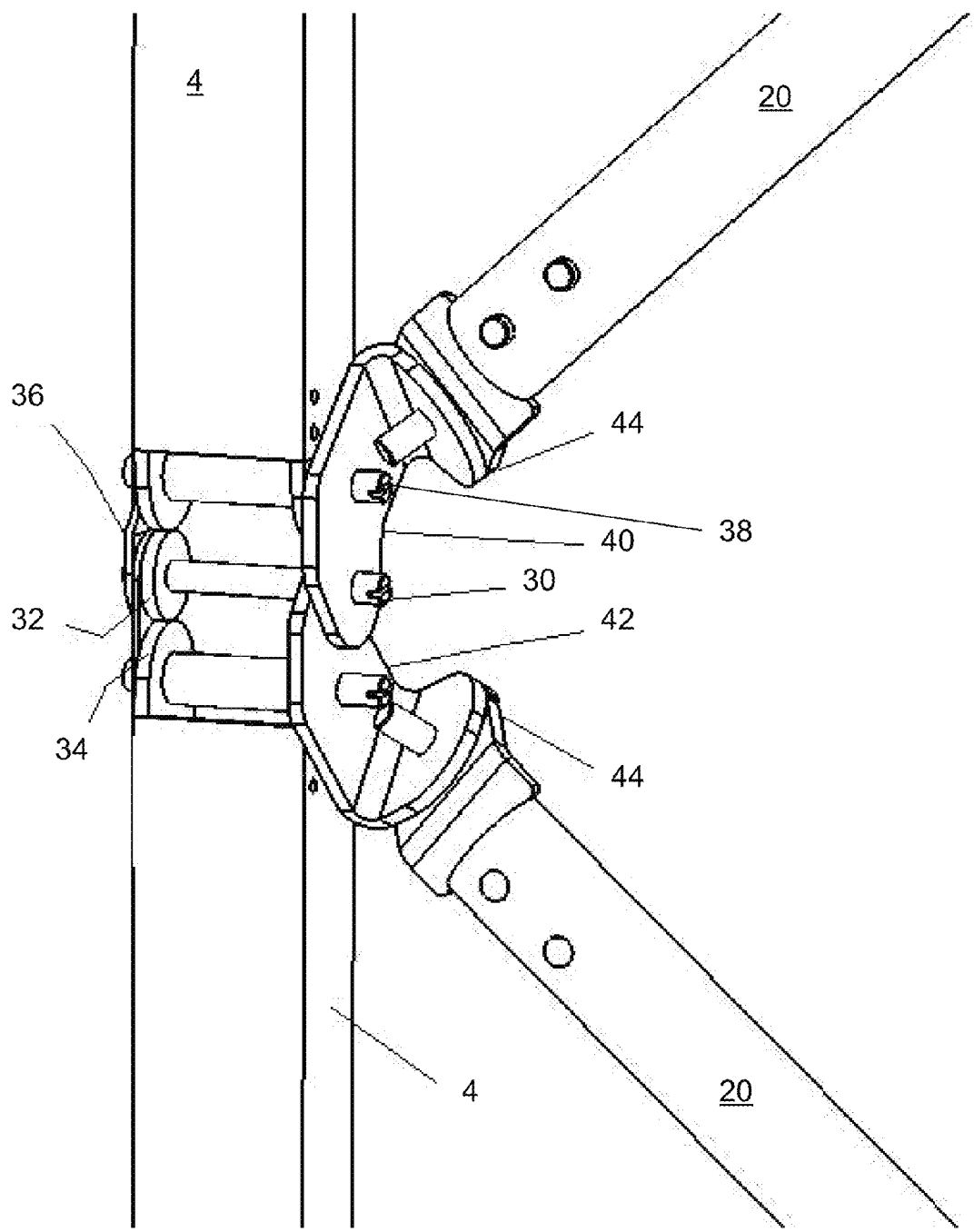
FIG. 5 shows a view of a primary orthogonal joint.

FIG. 5 is a close-up view of a primary orthogonal joint 6 and its connections to the primary chordal members 4 and the side diagonal members 20. The primary chordal members are hingedly connected by center hinge pin 30. When the truss is folding or unfolding, the primary chordal members 4 pivot to the interior of the truss around the center hinge pin 30. The center hinge pin 30 also serves to hinge together a first and second orthogonal joint fitting 40, 42. Each orthogonal joint fitting is angled at the opposite end from the center hinge pin 30 and is rotationally connected to a corresponding angled fitting 44 affixed to the end of the respective diagonal member 20.

As seen in FIG. 5, each orthogonal joint fitting 40, 42 comprises two hinge pin holes that are aligned with the primary chordal members 4. The outermost hinge pin hole on each fitting overlap to receive the center hinge pin 30. The innermost hinge pin hole on each fitting is used to fasten the fitting to the respective primary chordal member, by means of a bolt, screw or pin, or similar fastening means 38. The angled portion of each orthogonal joint fitting also comprises another hinge pin hole for rotationally connecting to the angled fittings 44, as described above. The axes of all six hinge-pin holes in a primary orthogonal joint are oriented three-dimensionally as shown, allowing the truss diagonals 20 to fold together relative to the in-folding, center-hinged primary chordal members 4 as they fold together. In one embodiment, fittings 40, 42, 44 are of formed sheet metal, although any suitable construction can be used, such as machining, casting, composites, or welding.

The angled rotational diagonal fitting allows the diagonal members 20 on each side of the truss to move and fold in the plane of the sides of the truss (as shown in FIG. 3). This unique geometry allows the secondary chords, and any panels mounted thereon, to fold inside of and adjacent to the diagonals. When the truss is folding or unfolding, as shown in FIG. 4, all members move with synchronous and stable motion. The action of the primary orthogonal joints 6 causes each main hinge axis to remain orthogonal to the longitudinal axis, and the truss bays remain aligned to each other by the action of the primary chordal members 4 which fold inward at the primary chord center-hinge joint 8.

At the ends of the diagonal members 20 opposite the primary orthogonal joints are the secondary chord hinge joints 16. These hinge joints are comprised of two halves, hingedly connected with a hinge pin or other similar means. The hinge halves are connected to the adjacent ends of adjacent secondary chordal members 14, with the respective other ends of each chordal members connected to hinge halves comprising secondary chord center-hinge joints 18. Transverse support members 22 may extend laterally between corresponding hinge joints on the secondary chords.

The secondary chordal members can be conventional truss members, or alternatively, can comprise the sides of panels 90 which extend laterally between the two secondary chords 12. The panels may be hinged connected so as to fold adjacent to each other in a z-fold fashion, in a similar fashion to the secondary chordal members. Major benefits of this new and novel geometry are that the truss can deploy z-folded panels with active surfaces such as photovoltaic, reflective, heat-radiating, LCD/plasma, or radar; or structural floor panels for folding work platforms, bridges, and walkways. In one embodiment, with the use of folding chords versus panels, the present invention can form a rectangular truss beam structure.

When panels are used to form the "panel truss" embodiment, the panels are compactly folded or nested between the four diagonals. In another embodiment, primary cross members 24 may extend between the corresponding primary orthogonal joints 6 on the primary chords to provide transverse support. Diagonal cables 28 which extend between opposing ends of opposite diagonals, may be used when needed to resist lateral loads, as shown in FIG. 2.

In one exemplary embodiment, the center hinge pin 30 may fit within a circular disc 32 which mates with semi-circular load bearing surfaces 34 on the respective ends of the primary chordal members 4. A pair of chain links 36 may join the hinge pins of the chordal end connections to carry tension loading. These two features allow the chords to carry loads through the primary orthogonal joints while exhibiting only pivotal freedom. As shown in FIG. 4, where the truss is in an intermediate folding state, the z-fold primary chords, as well as the z-fold panels 90, create two-axis bending rigidity. For low-gravity or zero-g space environments, this enhances kinematically stable operation. FIG. 3 shows three and one-half bays fully folded, and indicates how the primary chordal members 4 are z-folded or nested in a compact manner. The thickness of a folded bay is equal to twice the maximum thickness of the truss diagonals. Note that when folded, the center hinge pins 30 remain perpendicular to the truss longitudinal axis.

In one embodiment, all fittings and joint components are comprised of formed sheet metal, although any suitable construction can be used, such as machining, casting, composites or welding. For operation on a planar support surface, horizontal or inclined, small wheels or rollers 302 may be mounted to the ends of the primary cross members (i.e., transverse members) 24, the primary orthogonal joints 6, or the secondary chord hinge joint 16 hinge pins.

As shown in FIG. 1, the primary chord center-hinge joints 8 and/or the secondary chord center-hinge joints 18 may be fitted with suitable locking devices to lock the truss in its fully deployed state. These locating devices may be of various types, and may be manually or remotely operated. In one embodiment, the locking device comprises a strut 70 connected at one end to the center hinge pin of the primary orthogonal joint, and at the other end to the hinge pin of the secondary hinge joint on the secondary chords by means of a track or slot in which the end of the hinge pin of the secondary hinge joint can ride or move. At full extension, the end of the hinge pin is held in place by a notch in the track or slot, or other retention means, and thus may become a load-carrying member of the deployed truss. When released, the hinge pin moves synchronously down the slot during folding, so that the struts 70 fold adjacent to the diagonals. For powered truss operation, the truss bays may be fitted with suitable actuators.

Figure 6:
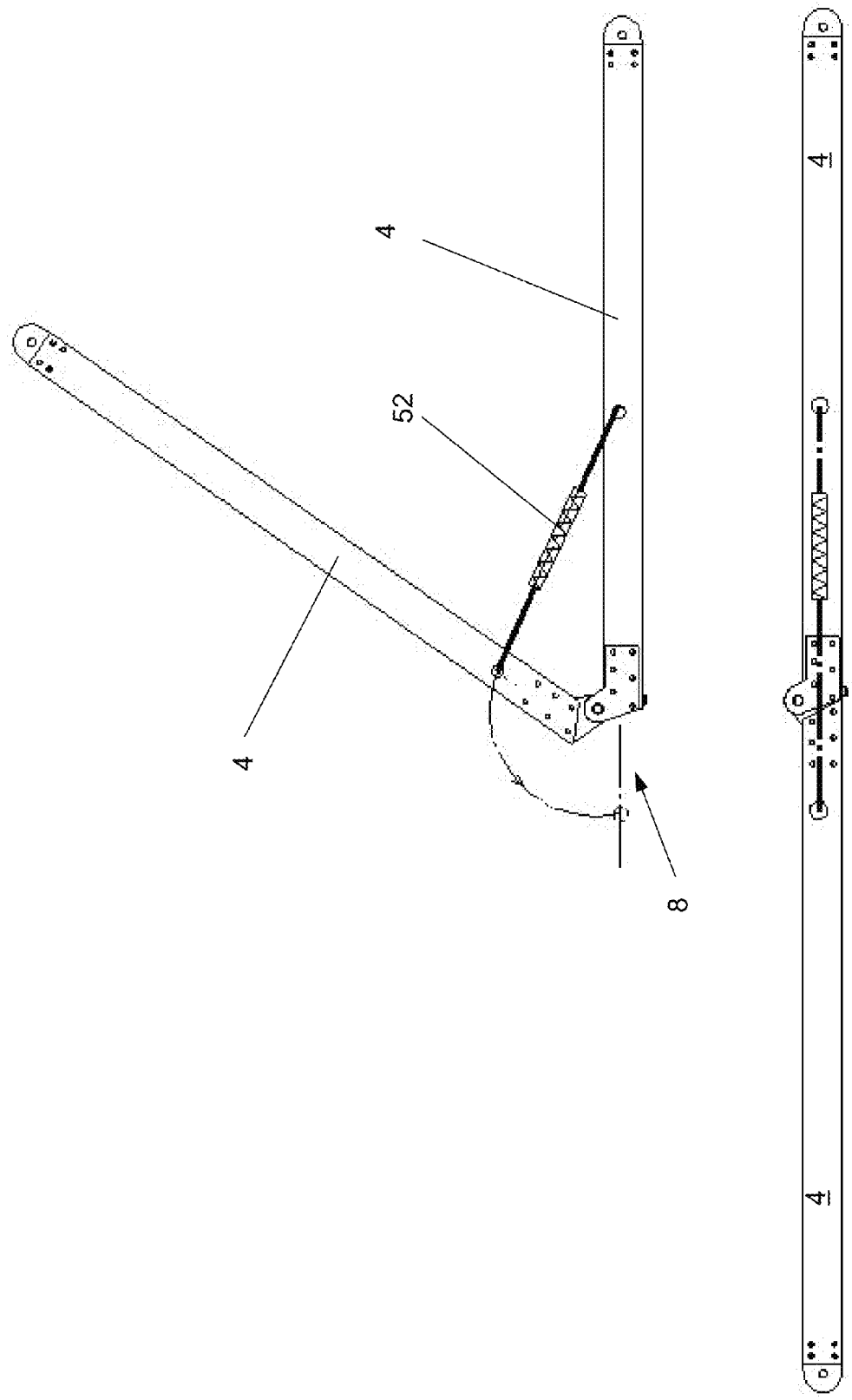
FIG. 6 shows a tension device connecting primary chordal members.

FIG. 6 shows an optional truss feature which improves the synchronous motion of the truss. This feature is a tension spring or pneumatic cylinder 52 connected to adjacent primary chordal members 4 across a primary chord center-hinge joint 8, which creates inter-bay resistance forces when the truss is acted on by axial end forces either extending the truss or letting it return to the folded state. In FIG. 5, the tension device 52 acts to resist unfolding of the chord. With spring forces in series (i.e., in each bay) the equal spring resistances tend to cause equal spacing of primary joints during truss extension and retraction motion. In an alternative embodiment, a torsion spring could be placed at the hinge pin to create a prevailing closing torque.

In yet another embodiment, the truss can be adapted to one or more structural end frames connected to the primary joints with hinge pins through two rotation fittings as described in the prior art. These allow the primary orthogonal joints to rotate slightly as the truss extends or retracts. At full extension the secondary chords (or panels) connect to the end frames.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A deployable truss, comprising:
two primary chords, said primary chords comprising a plurality of primary chordal members connected end-to-end by alternating primary orthogonal joints and primary chord center-hinge joints, wherein said primary orthogonal joints have different geometry than the primary chord center-hinge joints; and
two secondary chords, said secondary chords comprising a plurality of secondary chordal members connected end-to end by alternating secondary chord hinge joints and secondary chord center-hinge joints, wherein said secondary chord hinge joints have different geometry than the secondary chord center-hinge joints; and
a plurality of transverse members extending between the secondary chordal members;
wherein each primary chord is connected to the proximal secondary chord by a plurality of fixed-length diagonal members each with a first end and a second end, the first end jointedly connected to a primary orthogonal joint and the second end jointedly connected to a secondary chord hinge joint, wherein the primary orthogonal joints and the secondary chord hinge joints are not vertically aligned with each other;
further wherein said secondary chordal members fold alongside the diagonal members in a z-fold manner when the truss is expanded or retracted;
further wherein said primary chordal members are in-folding when the truss is retracted; and
further wherein each primary orthogonal joint comprises a main hinge pin, and each primary hinge joint comprise a hinge pin, and the hinge pins of the primary hinge joints remain parallel at all times to the main hinge pins of the primary orthogonal joints when the truss is expanded or retracted.

2. The truss of claim 1, wherein the primary chordal members, secondary chordal members, and diagonal member fold and deploy in a synchronous and coordinated manner when the truss is retracted or expanded.

3. The truss of claim 2, wherein the transverse members comprise panels extending between the secondary chordal members.

4. The truss of claim 2, wherein the transverse members comprise cross beams.

5. The truss of claim 2, wherein the transverse members comprise panels.

6. The truss of claim 3, wherein the panels are solar panels.

7. The truss of claim 3, wherein the panels are structural floor panels.

8. The truss of claim 1, further wherein the primary chordal members fold to the interior of the truss along the plane formed by the two primary chords when the truss is retracted.

9. The truss of claim 1, wherein the primary orthogonal joints are comprised of two hinged halves connected rotationally to the first ends of respective diagonal members.

10. The truss of claim 9, wherein the two hinged halves are connected rotationally to angled fittings affixed to the first ends of the diagonal members.

11. The truss of claim 1, wherein the diagonal members fold along the planes formed on the sides of the truss by the primary chords and the proximal secondary chords.

12. The truss of claim 1, further comprising chain links hingedly connecting adjacent ends of the primary chordal members.

13. The truss of claim 1, wherein each primary orthogonal joint comprises a main hinge pin, and a circular disc around the main hinge pin.

14. The truss of claim 1, further comprising a tension spring or pneumatic cylinder with two ends, each end connected to adjacent primary chordal members across a primary chord center-hinge joint.

15. The truss of claim 14, wherein the tension spring or pneumatic cylinder maintains a constant closing force about each primary hinge joint.

16. The truss of claim 1, wherein the truss in its retracted state occupies a length equal to twice the width of the truss side diagonals times the number of truss bays, with the folded panels and all chords nested within this length.

17. A deployable truss, comprising:
two primary chords, said primary chords comprising a plurality of primary chordal members connected end-to-end by alternating primary orthogonal joints and primary chord center-hinge joints, wherein said primary orthogonal joints have different geometry than the primary chord center-hinge joints; and
two secondary chords, said secondary chords comprising a plurality of secondary chordal members connected end-to end by alternating secondary chord hinge joints and secondary chord center-hinge joints, wherein said secondary chord hinge joints have different geometry than the secondary chord center-hinge joints; and
a plurality of transverse members extending between the secondary chordal members;
wherein each primary chord is connected to the proximal secondary chord by a plurality of fixed-length diagonal members each with a first end and a second end, the first end jointedly connected to a primary orthogonal joint and the second end jointedly connected to a secondary chord hinge joint, wherein the primary orthogonal joints and the secondary chord hinge joints are not vertically aligned with each other;
further wherein said secondary chordal members fold alongside the diagonal members in a z-fold manner when the truss is expanded or retracted;
further wherein said primary chordal members are in-folding when the truss is retracted;
further wherein the primary orthogonal joints are comprised of two hinged halves connected rotationally to the first ends of respective diagonal members; and
further wherein each primary orthogonal hinge half comprises three holes, a center hinge pin hole at one end of the hinge half adapted to receive a main hinge pin, a second hole proximate the center hinge pin hole for fastening the hinge half to the respective primary chordal member, and a third hole on an angled end of the hinge half opposite the center hinge pin hole adapted to connect to a diagonal member or fitting.

* * * * *